Feb. 3, 1931. H. W. SHRYOCK 1,791,093
REFLECTING HUB CAP
Filed Dec. 22, 1928
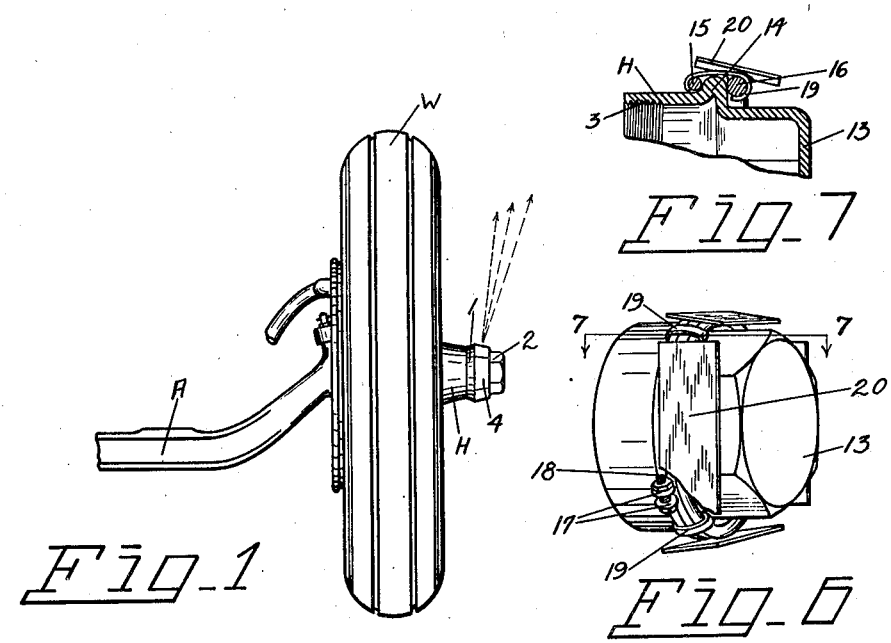
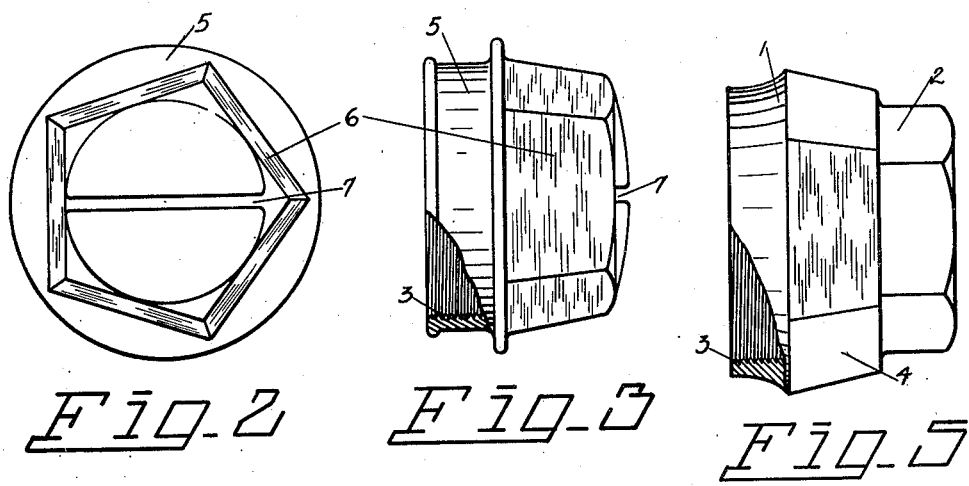
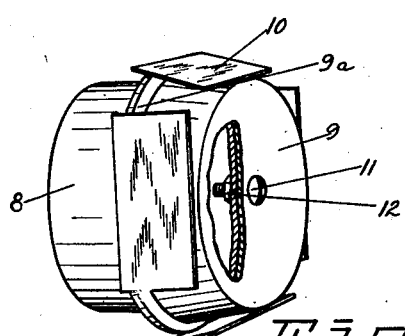
HARRY W. SHRYOCK Inventor
By Herbert E. Smith
Attorney Patented Feb. 3, 1931

1,791,093

UNITED STATES PATENT OFFICE

HARRY W. SHRYOCK, OF SEATTLE, WASHINGTON

REFLECTING HUB CAP

Application filed December 22, 1928. Serial No. 327,777.

My present invention relates to improvements in reflecting hub caps designed especially for use with the wheels of automotive vehicles. The left front wheel of the vehicle is usually equipped with the device of my invention, but the right front wheel also, and the two rear wheels of the vehicle may also be equipped, if desired, with the reflecting hub caps.

In carrying out my invention the hub is fashioned with reflecting surfaces, disposed at such angles that as the wheel revolves, the surfaces will receive and reflect light rays, in flashes, that emanate from or are projected from the headlights of an approaching vehicle, in order that the driver of the approaching vehicle may properly locate the position of the vehicle that is equipped with the reflecting hub caps.

The invention consists in certain novel combinations and arrangements of parts as will hereinafter be more fully set forth and claimed. In the accompanying drawings I have illustrated several forms of the invention in which the parts are combined and arranged according to the best modes I have thus far devised for the practical application of the principles of my invention.

Figure 1 is a front view of the left front wheel and related parts of an automotive vehicle equipped with the device of my invention.

Figure 2 is a face view of the standard type of hub cap having the angular reflecting faces thereon and provided with a kerf for use with a screw driver in attaching the cap to the hub.

Figure 3 is a side view of the hub cap of Figure 2 partly broken away for convenience of illustration.

Figure 4 is a perspective view of a hub cap provided with an attachable band carrying the reflecting surfaces, partly broken away for convenience of illustration.

Figure 5 is an enlarged edge view of the hub cap of Figure 1 broken away to disclose the interior screw threads for coaction with threads on the hub.

Figure 6 is a perspective view of another form of attachable device carried by the hub cap, and Figure 7 is a sectional detail view, as at line 7—7 of Figure 6.

In order that the general relation and utility of parts may readily be understood I have shown in Figure 1 an automobile wheel W, part of the front axle A and the hub H, the wheel being indicated as the left front wheel of the vehicle.

In Figures 1 and 5 the hub cap 1 is provided with the nut portion 2 to which a wrench may be applied when the screw threads 3 are being turned on the hub H to secure the hub cap in place. The hub cap is fashioned with a plurality of reflecting surfaces 4, arranged in an annular series, disposed at angles to each other, and the reflecting surfaces are arranged in planes inclined with relation to the axial center line of the hub cap and wheel so that the light rays emanating from a headlight carried by an approaching vehicle will strike the surfaces as the wheel revolves and be reflected for observation by the driver of the approaching vehicle. As will be understood, the approaching vehicle will be at the right of the wheel W, and the surfaces are disposed so that, the angle of incidence and the angle of reflection being equal, the light ray will be reflected in flashes as the wheel equipped with the reflecting surfaces revolves.

The reflecting surfaces 4 are smooth, highly polished, surfaces of the metallic hub cap, which may be maintained in condition for reflecting by rubbing with a suitable friction device, or in other suitable manner.

In Figures 2 and 3 the hub cap 5 has a series of reflecting faces 6, here shown as five in number, and a kerf 7 is provided in the outer face of the cap for the reception of a screw driver by means of which the threads 3 may be turned or screwed onto the complementary threads of the hub.

In some instances the device may be attached to the hub cap, as an auxiliary device, in suitable manner as disclosed in Figures 4, 6 and 7. In the modified form of Figure 4 the hub cap 8 is provided with an attachable cup 9 adapted to be fitted over the outer portion of the cap, and this cup has a tapering or frusto-conical, annular flange 9a to which a series of reflecting plates 10 is attached in suitable manner. These plates form an annular series of reflecting, polished surfaces, here shown as four in number, but the number may be increased or decreased as desired. The cup is fastened to the hub cap by means of a central screw 11 passing through complementary axial openings in the cup and cap, and an inner nut 12 is used to clamp the parts together.

In Figures 6 and 7 the attachable and removable device is used with a cap 13 having an exterior, annular flange or rib 14, and at the inner and outer sides of this annular flange a clamp ring as 15, 16, is arranged. The rings at their ends are fashioned with ears or loops 17 and screws or bolts 18 pass through the pairs of ears to clamp the rings about the hub cap. At suitable intervals tie straps 19 pass across the annular flange 14, with their ends looped around the respective rings to hold them on the cap, and reflecting plates 20 are attached to the two rings.

These adjustable, removable, devices of Figures 4, 6, and 7, may, with facility, be attached to the hub caps, the device of Figure 4 requiring only that a hole be drilled in the outer wall of the hub cap for the accommodation of the screw 11.

The removable, and attachable device of Figures 6 and 7, it will be apparent, may be clamped on any one of a number of different sizes of hub caps, and if desired the device may be removed and replaced with facility and convenience.

Having thus fully described my invention, what I claim as new and desire to secure by Letters Patent is:—

1. A hub cap having on the periphery thereof an annular series of reflecting surfaces disposed at angles to each other, and each said surface also disposed at an angle to the axial center of the hub cap.

2. The combination with a hub cap, of an annular member and means for fastening said member on the cap, and an annular series of reflecting elements mounted on the periphery of said member, said elements disposed at angles to each other and also each said element disposed at an angle to the axial center of the hub cap.

3. The combination with a hub cap having an annular exterior flange, of a pair of clamp rings located at the sides of the flange and fastening devices for the rings, tie straps connecting said rings, and an annular series of reflecting plates mounted on said rings, said plates having reflecting surfaces disposed at angles one to another and also disposed at angles to the axial center of the hub cap.

In testimony whereof I affix my signature.

HARRY W. SHRYOCK.